(12) United States Patent
Schwichtenberg et al.

(10) Patent No.: US 7,216,500 B2
(45) Date of Patent: May 15, 2007

(54) REFRIGERATED WORKSURFACE

(75) Inventors: Bradley R. Schwichtenberg, Midlothian, VA (US); J. Keith Norton, Richmond, VA (US)

(73) Assignee: Dover Systems, Inc., Duluth, GA (US)

( * ) Notice: Subject to any disclaimer, the term of this patent is extended or adjusted under 35 U.S.C. 154(b) by 100 days.

(21) Appl. No.: 10/947,587

(22) Filed: Sep. 22, 2004

(65) Prior Publication Data

US 2005/0066683 A1    Mar. 31, 2005

Related U.S. Application Data

(60) Provisional application No. 60/506,098, filed on Sep. 25, 2003.

(51) Int. Cl.
F25D 23/12 (2006.01)
(52) U.S. Cl. ............... 62/258; 62/434; 62/524
(58) Field of Classification Search ............... 62/258, 62/458, 430–439, 516–518, 524
See application file for complete search history.

(56) References Cited

U.S. PATENT DOCUMENTS

| | | | |
|---|---|---|---|
| 1,743,763 A | 1/1930 | Erickson | |
| 1,831,861 A | 11/1931 | Henney | |
| 1,896,693 A | 2/1933 | Battista | |
| 2,105,566 A | 1/1938 | Waunch | |
| 2,136,232 A | 11/1938 | Bromann, Jr. | |
| 2,156,795 A | 5/1939 | Smith | |
| 2,209,690 A | 7/1940 | Fraser | |
| 2,360,074 A | 10/1944 | Robison | |
| 2,373,905 A * | 4/1945 | Morrison | 62/442 |
| 2,382,599 A | 8/1945 | Blair | |
| 2,607,204 A | 8/1952 | Kleist | |
| 2,663,159 A | 12/1953 | Ullstrand | |
| 2,932,955 A | 4/1960 | Hargrave et al. | |
| 2,962,874 A | 12/1960 | Fitzgerald | |
| 3,422,600 A | 1/1969 | Chamberlain | |
| 3,555,848 A | 1/1971 | Johnson | |
| 3,730,603 A | 5/1973 | Looms | |
| 3,832,862 A | 9/1974 | Ingels | |
| 3,869,870 A | 3/1975 | Kuehner | |
| 3,919,858 A * | 11/1975 | Garland et al. | 62/498 |

(Continued)

FOREIGN PATENT DOCUMENTS

DE    30 08 742 A1    10/1981

OTHER PUBLICATIONS

The International Search Report, based on PCT/US2004/030861, date of mailing of the International Search Report Dec. 29, 2004, (2 pages).

Primary Examiner—William E. Tapolcai
(74) Attorney, Agent, or Firm—Foley & Lardner LLP

(57) ABSTRACT

A refrigerated worksurface for processing food products includes a base and at least one cooling element supported on the base. A preparation surface is positioned on the base atop the cooling element and is configured to be cooled by the cooling element. A cooling system is configured to circulate a coolant through the cooling element so that a temperature of the preparation surface is maintained within a predetermined range. The cooling element may be one or more cooling element pans or may be a passage beneath the preparation surface for flow of fluid through the passage and in contact with an underside of the preparation surface.

18 Claims, 8 Drawing Sheets

U.S. PATENT DOCUMENTS

| | | |
|---|---|---|
| 3,941,548 A | 3/1976 | Bruder |
| 3,952,794 A | 4/1976 | Spanoudis |
| 3,986,337 A | 10/1976 | Richard |
| 4,189,928 A | 2/1980 | Cerny |
| 4,280,335 A | 7/1981 | Perez et al. |
| 4,306,616 A | 12/1981 | Woods, Jr. et al. |
| 4,593,752 A | 6/1986 | Tipton |
| 4,712,387 A | 12/1987 | James et al. |
| 4,782,665 A | 11/1988 | Wolfe |
| 4,802,340 A | 2/1989 | Johnson |
| 4,904,848 A | 2/1990 | Colevas |
| 4,984,435 A | 1/1991 | Seino et al. |
| 5,346,000 A * | 9/1994 | Schlitt ................... 165/104.26 |
| 5,381,670 A * | 1/1995 | Tippmann et al. ............ 62/330 |
| 5,544,495 A * | 8/1996 | Anderson et al. .......... 62/457.7 |
| 5,598,886 A | 2/1997 | Criado-Mellado |
| 5,657,639 A | 8/1997 | Lidbeck |
| 5,687,677 A | 11/1997 | Oslin |
| 5,735,131 A | 4/1998 | Lambright, Jr. et al. |
| 5,816,051 A | 10/1998 | Hall et al. |
| 5,921,096 A | 7/1999 | Warren |
| 5,931,018 A | 8/1999 | Hall et al. |
| 5,970,734 A | 10/1999 | Stillwell et al. |
| 6,185,951 B1 * | 2/2001 | Lane et al. ................... 62/246 |
| 6,434,961 B2 * | 8/2002 | Richmond et al. ............ 62/258 |
| 6,467,279 B1 | 10/2002 | Backman et al. |
| 6,502,420 B2 | 1/2003 | Gupte |
| 6,505,547 B1 | 1/2003 | Burnett et al. |
| 6,564,570 B2 * | 5/2003 | Koike et al. .................. 62/258 |
| 6,684,943 B2 | 2/2004 | Dobbs et al. |

* cited by examiner

REFRIGERATED WORKSURFACE

CROSS-REFERENCE TO RELATED PATENT APPLICATIONS

This Application claims the benefit of priority as available under 35 U.S.C. § 119(e) to U.S. Provisional Patent Application No. 60/506,098, titled "Refrigerated Preparation Table" filed Sep. 25, 2003, which is incorporated herein by reference in its entirety.

BACKGROUND

The present invention relates to a refrigerated worksurface. The present invention more specifically relates to a refrigerated preparation table having a refrigerated worksurface for preparing objects such as food products.

It is known to provide for a refrigerated table that may be used for preparing food products (such as meat, etc.). Such known refrigerated tables typically provide a platform or surface for preparing food products and a cooling coil having a refrigerant (such as a volatile, direct expansion refrigerant) circulated through the cooling coil to provide cooling to the surface of the table.

For example: U.S. Pat. Nos. 2,105,566 and 2,156,795 show a cutting block that rests on coils carrying refrigerant. U.S. Pat. No. 3,422,600 shows a cutting table having a plenum that directs cold air onto a working surface. U.S. Pat. No. 4,189,928 shows cooling coils for freezing a liquid into a block that provides an ice-top cutting surface. However, such known refrigerated worksurfaces do not realize certain advantageous features (and/or combinations of features).

It would be desirable to provide a refrigerated worksurface or the like of a type disclosed in the present Application that includes any one or more of these or other advantageous features:
  (1) A preparation surface that resist introduction of bacteria and residue from the food products and is readily cleanable.
  (2) A drain system configured to remove condensation and other liquids from the preparation surface.
  (3) Cooling elements to provide cooling to the preparation surface.
  (4) Multiple cooling elements that are individually controllable to provide a desired pattern of cooling rates on the preparation surface.
  (5) Cooling elements that ate removable to facilitate assembly, maintenance and replacement activities.
  (6) Cooling elements in the form of "pans" having a series of passageways for circulation of a coolant.
  (7) A thermal conducting layer interfacing with the cooling elements and the preparation surface to promote cooling of the preparation surface and to enhance uniformity of the temperature of the preparation surface to reduce "warm spots."
  (8) A cooling system for providing a liquid coolant for circulation through one or more of the cooling elements.
  (9) A cooling system capable of interconnection with a network of other refrigeration devices within a facility.
  (10) A cooling system capable of operation as a stand-alone unit.
  (11) A preparation surface having a cavity configured for flow-through of a coolant and stiffening structure configured to support the weight of the coolant and the weight of food products thereon.
  (12) A modular construction capable of disassembly and reassembly intended to reduce the shipping volume of the refrigerated preparation table from a factory to an end user (e.g. a facility such as a supermarket, meat-packing facility, or the like).
  (13) Insulation intended to improve the thermal performance of the refrigerated preparation table and to reduce condensation.

SUMMARY

The present invention relates to a refrigerated worksurface for processing food products and includes a base, at least one cooling element supported on the base, a preparation surface atop the cooling element and configured to be cooled by the cooling element, and a cooling system configured to circulate a coolant within the cooling element so that a temperature of the preparation surface is maintained within a predetermined range.

The present invention also relates to a refrigerated worksurface having a base, a preparation surface supported on the base, and a passage integral with the preparation surface and configured for flow of a coolant therethrough in contact with an underside of the preparation surface.

The present invention also relates to a refrigerated preparation table for maintaining a cold worksurface for processing food products. The table includes a base and cooling elements supported on the base and the worksurface interfaces with the cooling elements. A cooling system circulates a liquid coolant to the cooling elements. A control system permits independent control of coolant circulation to each cooling element, so that additional cooling capability is available for frequently used sections of the worksurface and reduced cooling capability is available for less frequently used sections of the worksurface.

The present invention also relates to a system for providing a refrigerated worksurface for use in processing food products and includes a base, at least one cooling element supported on the base, a surface above the cooling element, a layer of thermal conducting material interfacing between the cooling element and the surface. A cooling system circulates a coolant within the cooling element so that a temperature of the surface is maintained within a predetermined range.

The present invention further relates to a refrigerated table that includes a base and a generally horizontal worksurface atop the base. A cooling system is at least partially contained within the base and provides a coolant. A cooling element interfaces with the worksurface so that a temperature of the worksurface is maintained within a predetermined range.

DETAILED DESCRIPTION

Referring to the FIGURES, the basic elements and assemblies of the refrigerated worksurface include a preparation surface, a drain system, cooling elements, a cooling system, a base, and a stand. The refrigerated worksurface is intended for use in preparing objects (such as food products) in facilities (such as supermarkets, butcher shops, meat packing facilities, etc.) so that the temperature of the food products is maintained within a suitable temperature range as required by applicable food service/handling regulations.

Figure 1:
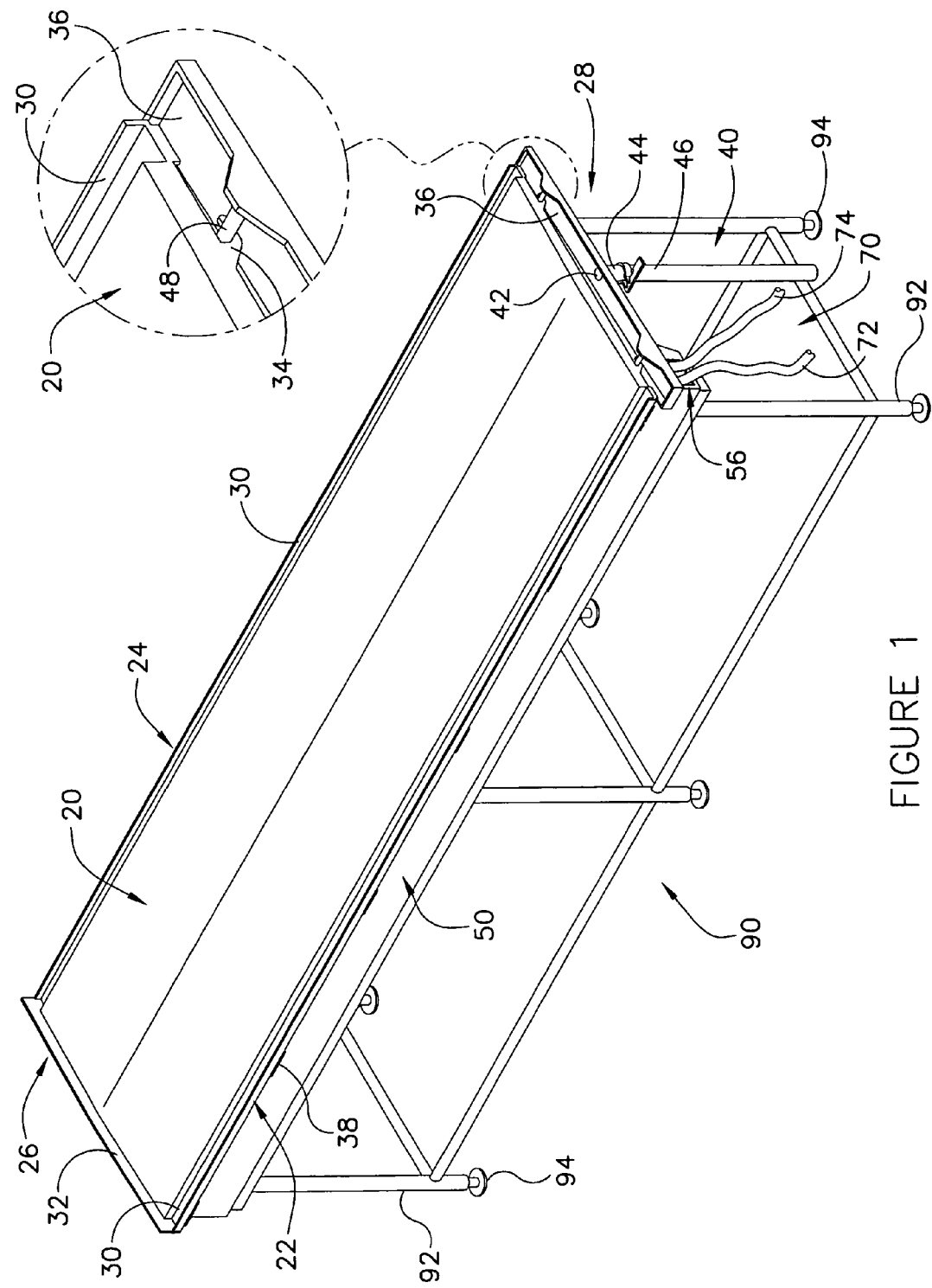
FIG. 1 is a schematic representation of a front perspective view of a refrigerated worksurface according to one embodiment.

A preparation surface 20 is shown in FIG. 1 according to one embodiment. The preparation surface 20 (e.g. cutting surface, etc.) is shown as a generally rectangular panel having a front 22, a back 24, a first end 26, a second end 28, a top side and an underside. The preparation surface 20 is shown to be formed with an arched profile (e.g. bowed, crowned, rounded, etc.) to promote run-off of liquids (such as condensation or other liquids or fluids such as meat juices, etc.) toward the front and back of the preparation surface.

The preparation surface shown in FIG. 1 includes a collector 30 (e.g. gutter, trough, channel, etc.) provided along the front 22 and the back 24 of the preparation surface 20 to collect liquids from the preparation surface. The first end 26 of the preparation surface 20 is provided with a wall 32 (e.g. curb, etc.) and the second end 28 of the preparation surface 20 is provided with holders 34 (e.g. clips, brackets, etc.) for coupling a collection header 36 configured to receive the liquids or materials from the collectors.

The preparation surface 20 is configured for attachment to a base 50 by connectors 38 (shown as L-shaped brackets in FIGS. 2 and 3) along the front 22 and the back 24. The preparation surface may also be integrally formed with the base, or attached to the base in any suitable manner.

According to one embodiment, the preparation surface is formed from a sheet metal material (such as stainless steel, but may be other suitable materials). The elements and components of the preparation surface may be integrally formed (e.g. bending, etc.) or may be joined by a suitable process (e.g. welding, brazing, fasteners, etc.). Other materials may be provided on the top side to provide an enhanced cutting surface, such as a layer of a non-metallic material (e.g. plastic, nylon, other "cutting board" type materials or coatings, etc.) which may be removed for cleaning. Such cutting surface materials may be reusable until the end of their useful life and then replaced. According to alternative embodiments, the preparation surface may be formed from non-metallic materials, such as plastic, in a suitable molding process such as injection molding.

According to any preferred embodiment, the preparation surface is configured to permit preparation of objects (such as food products, for example, large cuts of meat, sides of beef, etc.) on the top side and to be cooled on the underside to provide a "contact" cooling effect on the food products during processing on the preparation surface.

According to an alternative embodiment, the preparation surface may be provided in other shapes and sizes. For example, the preparation surface may be provided without an arch and may be sloped toward the front or back to promote drainage of liquids. The preparation surface may also be flat and substantially without slope and liquids may be removed from the surface by wiping, squeegee, spray, hose, etc.

A drain system 40 is shown in FIG. 1 according to one embodiment. The drain system 40 as shown includes the collectors 30 along the front 22 and back 24 of the preparation surface 20, the wall 32 on the first end 26, and the collection header 36 configured for coupling to the second end 28. The preparation surface 20 is configured so that the first end 26 is elevated slightly above the second end 28 so that liquids in the collectors 30 drain toward the second end 28 of the preparation surface 20 (e.g. gravity drain, etc.). The degree of elevation (e.g. "pitch," etc.) of the first end 26 relative to the second end 28 is intended to create sufficient gravity drainage of liquids along the length of the preparation surface toward the collection header. According to an alternative embodiment, the preparation surface may be provided in a generally level configuration and the collectors may be "sloped" along the front and back of the preparation surface.

The collection header 36 is shown formed in the shape of a gutter or trough having side walls, end walls and a bottom that slopes toward an opening 42 shown in the center of the collection header 36. The opening 42 is provided with a "collar" 44 for connection to a drain line 46 (e.g. down spout, etc.). Pins 48 (e.g. posts, links, bars, etc.) are shown extending between the side walls and configured for engagement with the holders 34 extending from the preparation surface 20 so that the collection header 36 can be attached in a removable manner beneath the preparation surface 20 at the second end 28 to receive liquids drained from the preparation surface 20 via the collectors 30.

Figure 6A:
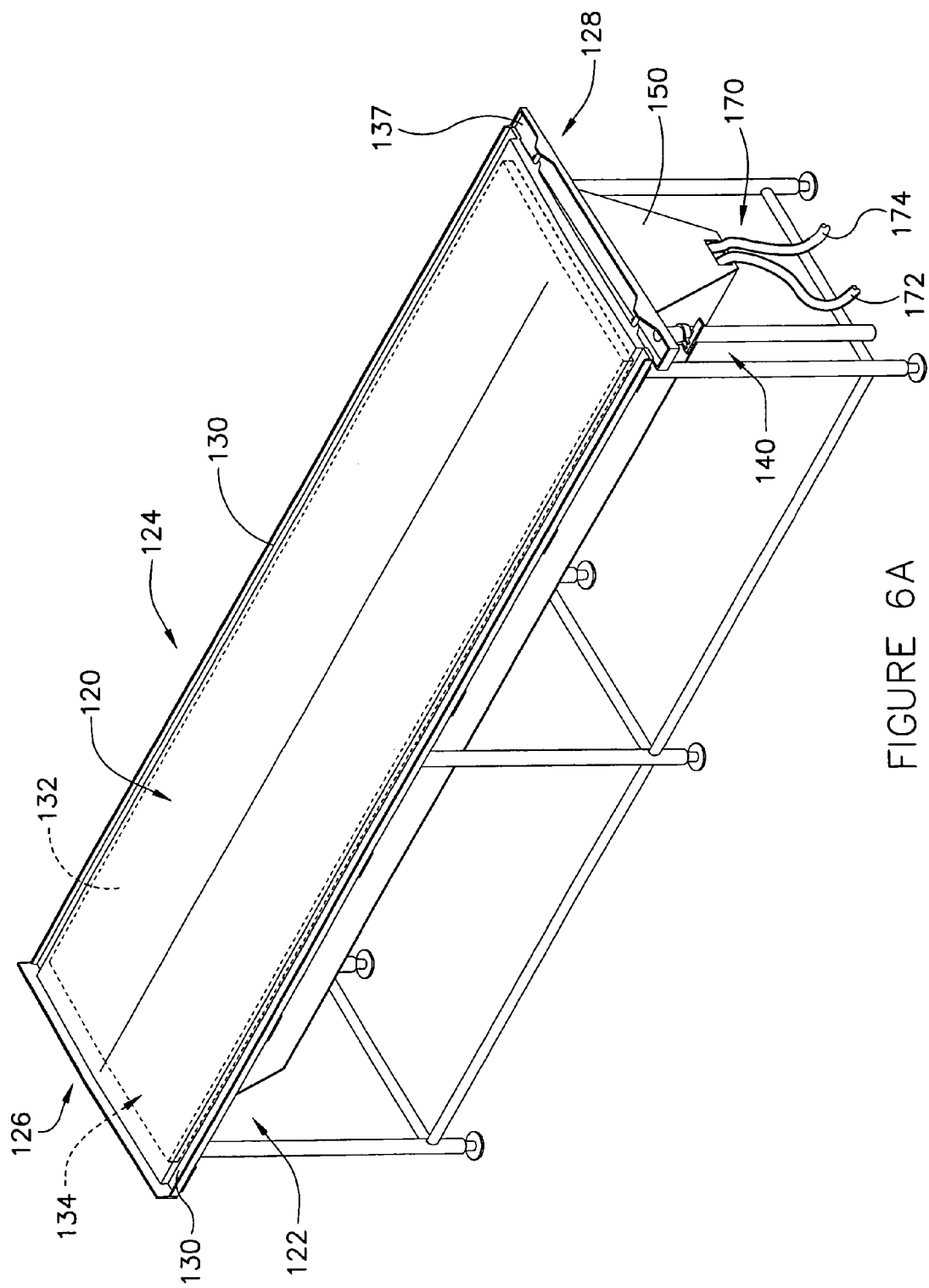
FIG. 6A is a schematic representation of a front perspective view of a refrigerated worksurface according to another embodiment.

The collection header is shown for use with a single preparation surface in FIGS. 1 and 6A. The collection header is also adaptable for use with two preparation surfaces. The collection header has a width that is sufficient to span a distance between the second ends of two refrigerated preparation tables that are placed in an end-to-end relationship (i.e. adjacent, abutting, etc.), where the pins are also configured to engage the holders extending from the preparation surface of the second refrigerated table (not shown).

According to one embodiment, the drain system is fabricated from a sheet metal material (such as stainless steel) but may be formed from other suitable materials (such as galvanized steel, aluminum, plastic, PVC, etc.), and the drain line is shown as a circular tube (e.g. pipe, etc.), but may be a hose or other suitable member for draining liquids away from the preparation surface to a suitable repository. The drain line may be coupled to the collar by any suitable connecting device (such as a clamp), or may be unitarily formed with the collection header.

According to any exemplary embodiment, the drain system is configured to promote "run-off" of liquids from the food preparation surface to a collector, which is configured to route the liquids to a drain line for disposal or to a suitable repository.

Cooling element(s) 60 for use in providing cooling to the refrigerated worksurface are shown in FIGS. 2, 4A-4B and 5 according to one embodiment. The cooling elements 60 are shown as six cooling elements supported on the base 50 and are configured to provide cooling to the underside of the preparation surface 20 so that thermal conduction through the preparation surface 20 will tend to minimize "warming" of food products that are processed on the top side of the preparation surface.

Figure 2:
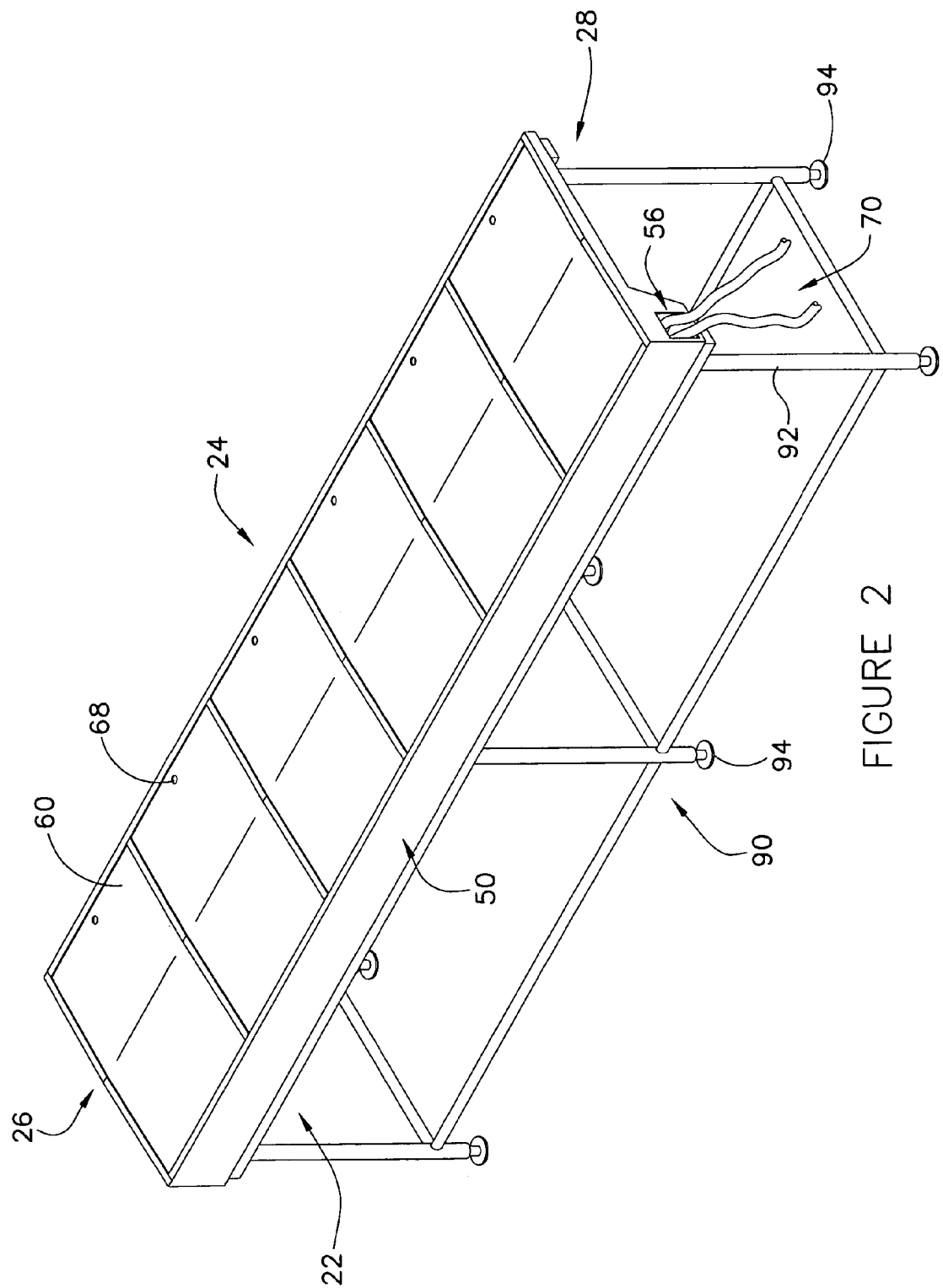
FIG. 2 is a schematic representation of a front perspective view of a portion of the refrigerated worksurface according to the embodiment of FIG. 1.
Figure 3:
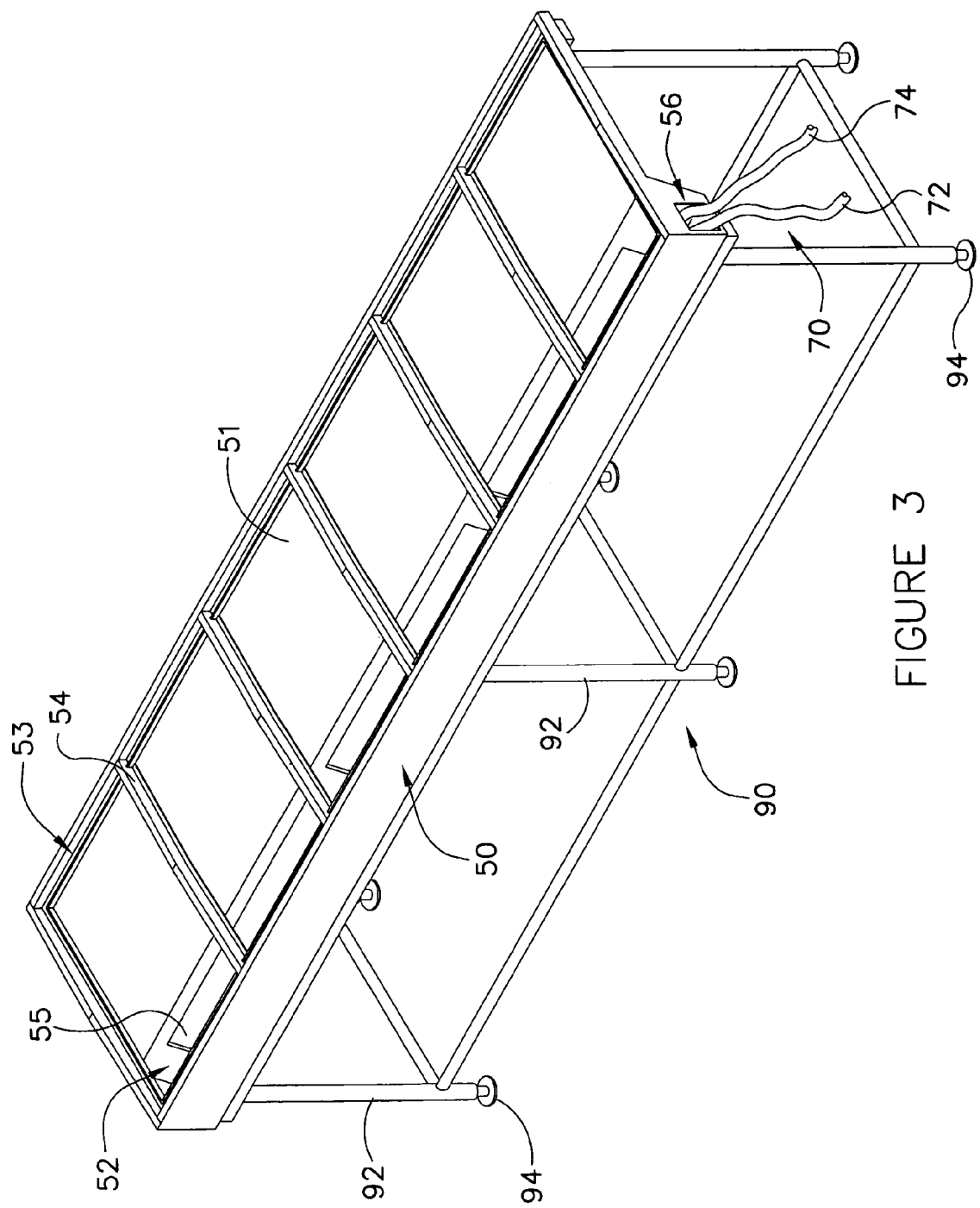
FIG. 3 is a schematic representation of a front perspective view of a portion of the refrigerated worksurface according to the embodiment of FIG. 2.
Figure 6B:
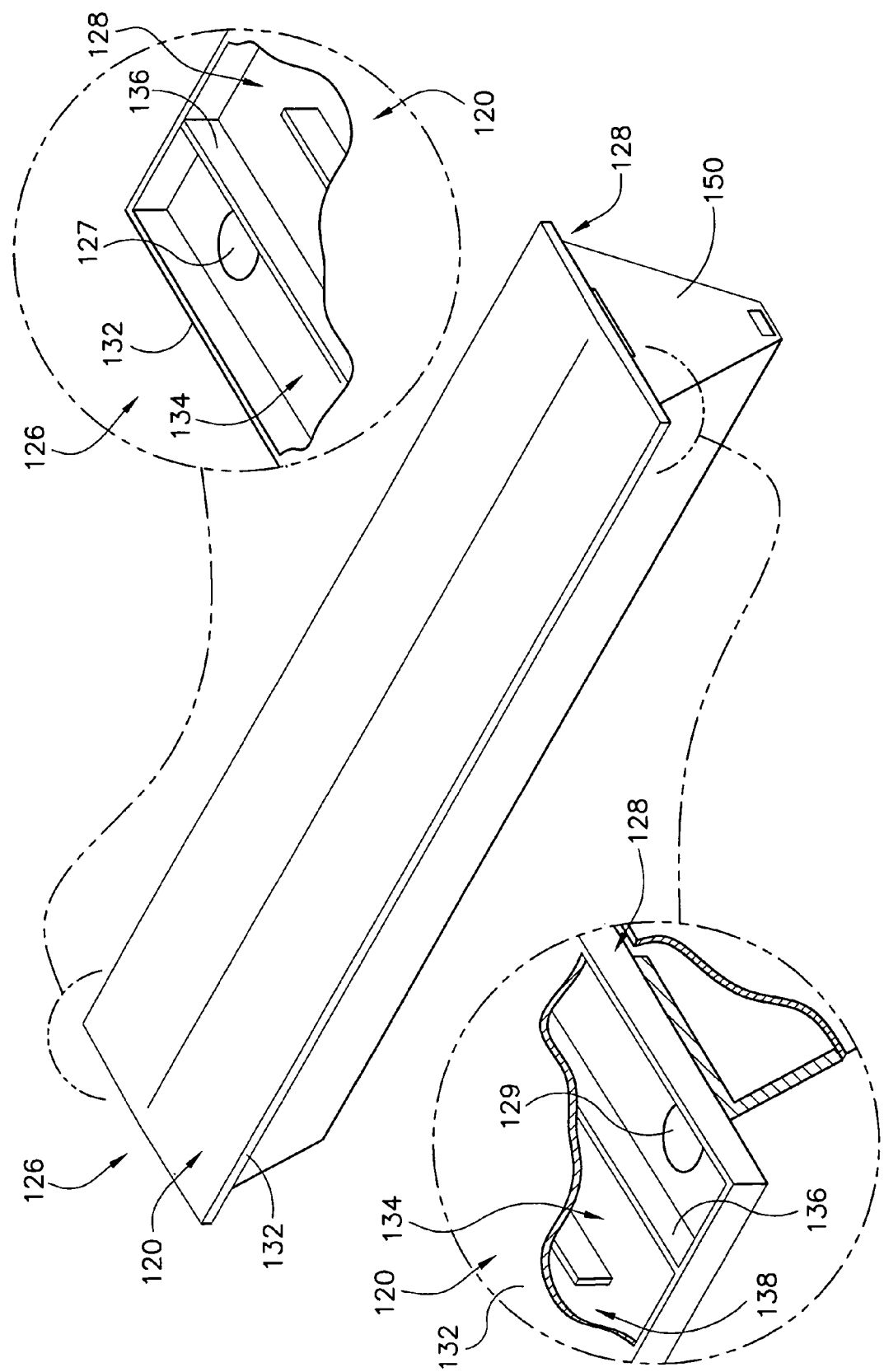
FIG. 6B is a schematic representation of a front perspective view of a portion of the refrigerated worksurface according to the embodiment of FIG. 6A.
Figure 6C:
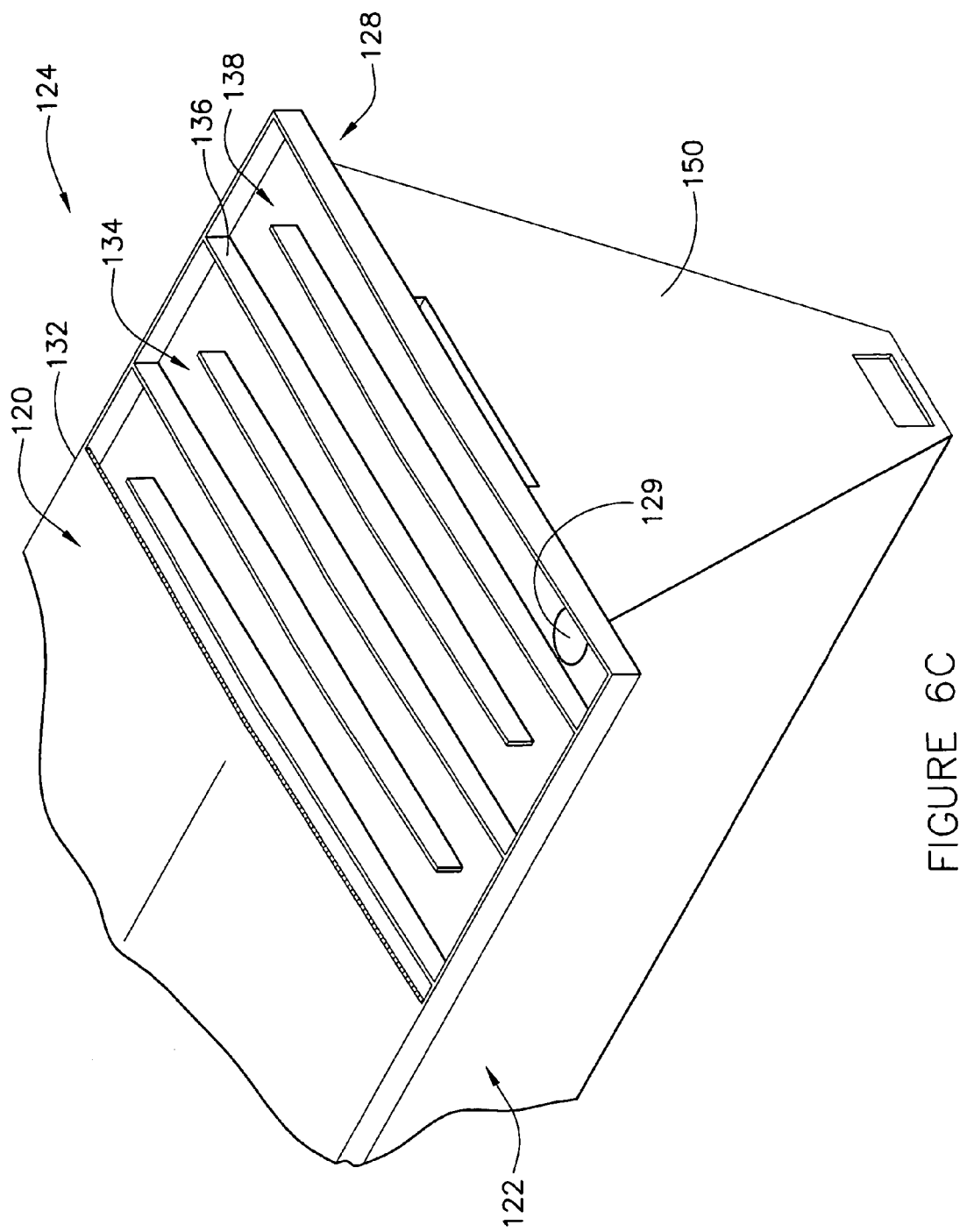
FIG. 6C is a schematic representation of a front perspective view of a portion of the refrigerated worksurface according to the embodiment of FIG. 6A.

According to any exemplary embodiment, cooling is provided to the underside of the preparation surface by cooling element(s). According to one embodiment as shown in FIGS. 2 and 3 the cooling elements are shown as removable pans that are positioned in close proximity to the underside of the preparation surface and receive a supply of a coolant. According to another embodiment as shown in FIGS. 6A-6C, the cooling element may be a passage(s) located beneath the preparation surface and configured to permit flow of a coolant therethrough for direct fluid contact with the underside of the preparation surface.

Figure 4A:
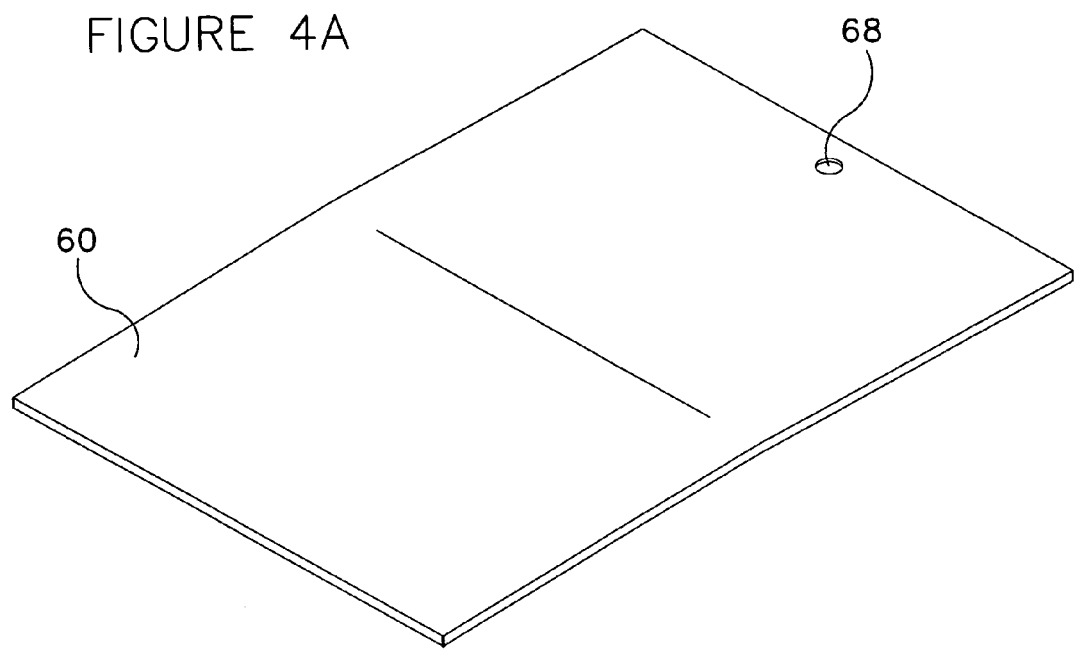
FIG. 4A is a schematic representation of a top perspective view of a cooling element of the refrigerated worksurface according to the embodiment of FIG. 2.
Figure 4B:
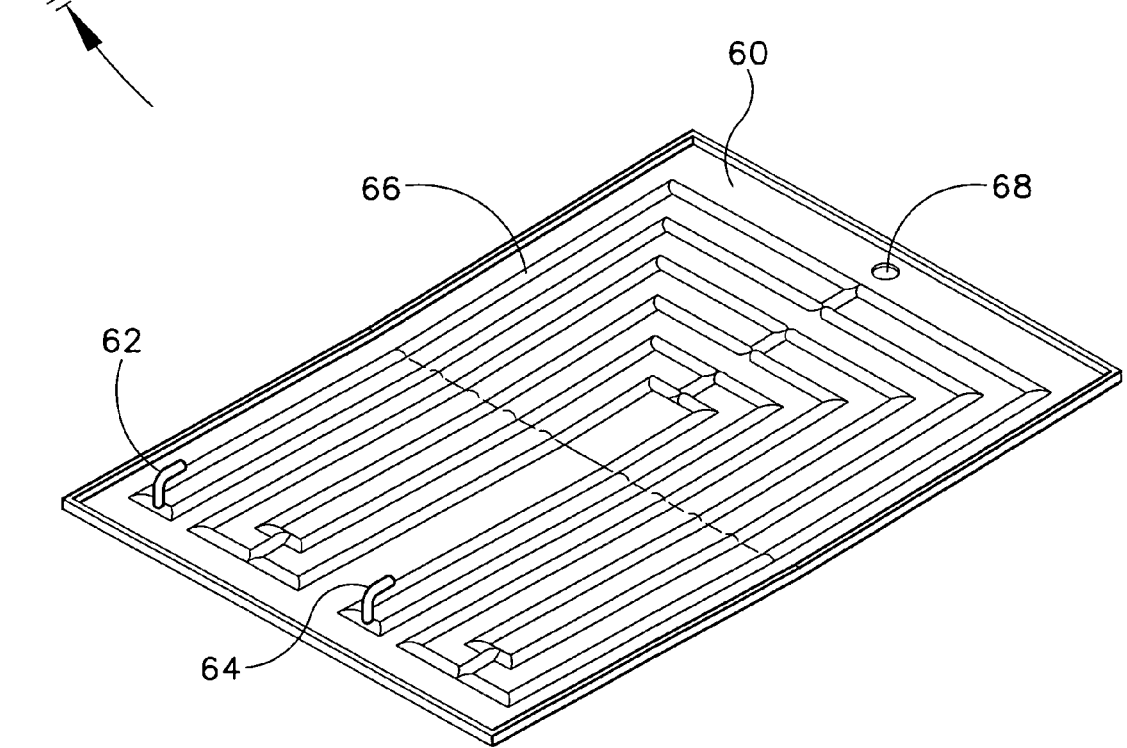
FIG. 4B is a schematic representation of a bottom perspective view of a cooling element of the refrigerated worksurface according to the embodiment of FIG. 2.
Figure 5:
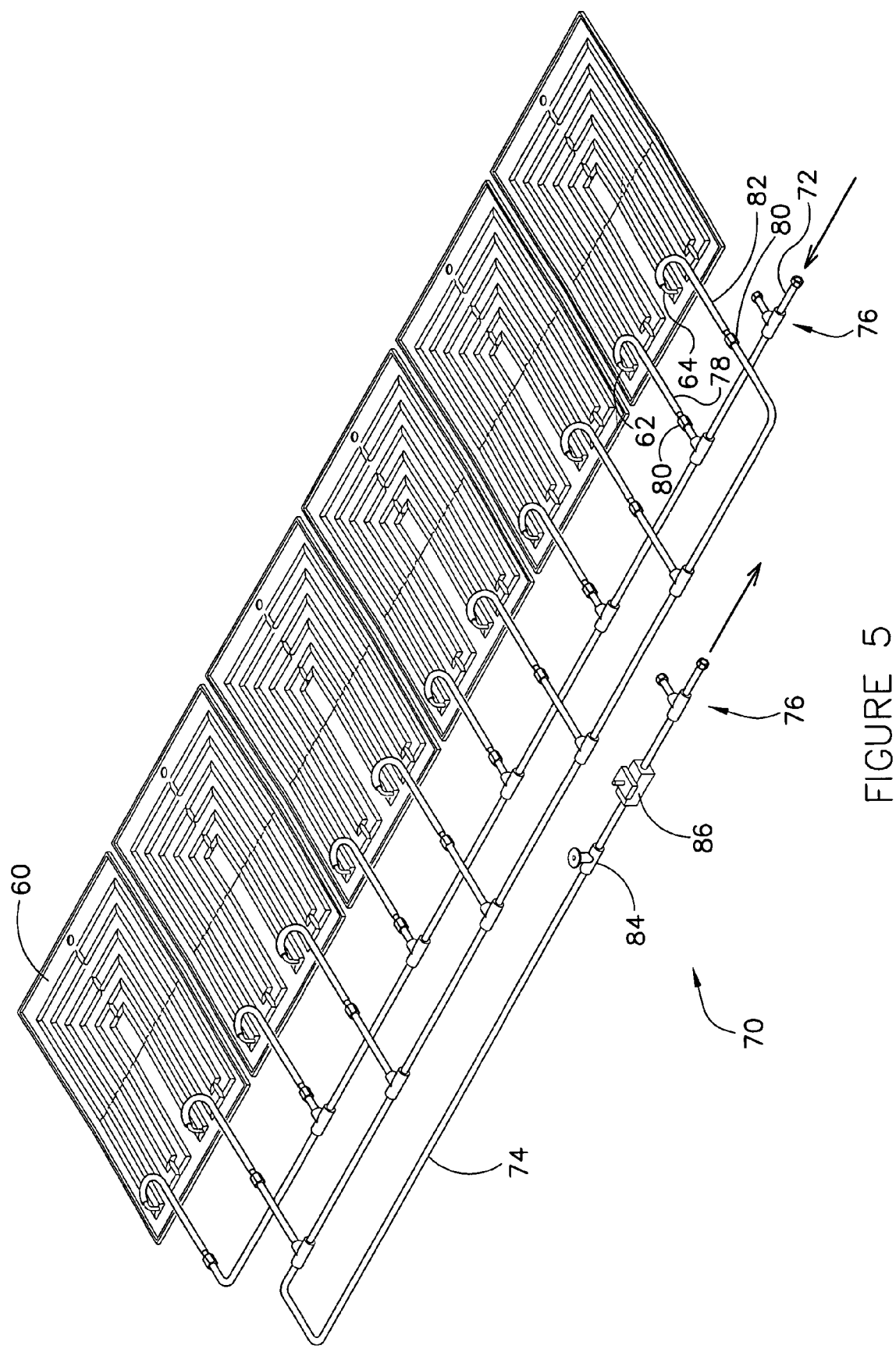
FIG. 5 is a schematic diagram of fluid flow components of the refrigerated worksurface according to the embodiment of FIG. 2.

Referring to FIGS. 2, 4A-4B and 5, the cooling elements are shown as pans 60 (e.g. panels, etc.) and may be provided as a single pan or combination of multiple pans (shown in FIGS. 2 and 5 as six pans according to an exemplary embodiment). Each pan is intended to be removable and includes a pattern of passageways 66 (shown in FIGS. 4B and 5) for circulation of a coolant therethrough (such as a secondary liquid coolant) to provide cooling to the pan. The pans are shown as generally rectangular, but may be provided in any suitable shape corresponding to the shape of the preparation surface. For example, the pans may be triangular or "pie-shaped" for use with preparation surfaces that are "L-shaped," or in any other suitable shape and size for use in a desired application.

The pans 60 are supported on the base 50 and are positioned adjacent to the underside of the preparation surface 20 to provide cooling to the preparation surface 20. According to the illustrated embodiment, the pans 60 are formed having an "arch" (e.g. bow, crown, etc.—shown in FIGS. 4A and 4B) corresponding generally to the arch of the preparation surface 20 to promote direct contact, or to minimize the presence of an air gap or space, between the pans 60 and the underside of the preparation surface 20. According to another embodiment, the pans 60 may have an arch or bow that is slightly greater than the arch of the preparation surface so that the pans are resiliently biased into direct contact with the underside of the preparation surface (e.g. in the manner of a "leaf-type" spring, etc.). According to a further embodiment, a layer of a resilient material (e.g. foam Material, sponge-like material, compressible material, etc.—not shown) may be provided beneath the pans to bias the pans into contact with the underside of the preparation surface.

According to any preferred embodiment, a thermal conducting layer (e.g. membrane, coating, pad, matter, etc.) may be provided between the pan(s) 60 and the underside of the preparation surface 20 to improve thermal conduction between the pan(s) 60 and the preparation surface 20. The thermal conductive layer may be a resilient, compressible, or compliant material such as a flexible or sponge-like sheet or layer, a foam, or may be a gelatinous material, paste, compound or the like (such as a water-based gel or a silicone-based gel), or any other suitable material for transferring heat to the cooling element(s). For example, the thermal conducting layer may be a foam-like material such as a 5506 Conductive Sheet that is commercially available from the 3M Corporation. By further way of example, the thermal conducting layer may be a compound such as AOS Heat Sink Compound that is commercially available from AOS Thermal Compounds of Eatontown, N.J.

The pans 60 are provided with a supply connection 62 and a return connection 64 configured to circulate the coolant from a supply header 72 of the cooling system 70, through the passage 66 in pan 60, and to a return header 74 of the cooling system 70. The supply and return connections 62, 64 are shown in FIG. 4B as short tubing segments (e.g. "stubs," etc.) extending in an "elbow" configuration from an underside of the pans 60. The pans 60 are also provided with an opening 68 (shown as a circular "hole") to permit convenient installation and removal of the pans 60 from the base 50.

According to a preferred embodiment, the pans are fabricated from a sheet metal material and provided with a coating (e.g. an epoxy coating) such as are commercially available from Tower Automotive. According to other embodiments, the pans can be made from an uncoated material such as stainless steel, copper, etc. For example, the pans may be formed from a plastic material in a suitable process (e.g. blow-molding, etc.).

Referring to FIGS. 6A-6C, a cooling element in the form of a fluid passage that is integrated with a preparation surface 120 as a "flow-through" or "flooded" type device is shown according to another embodiment. The integrated cooling element and preparation surface 120 is intended to provide direct contact between the coolant and the underside of the preparation surface 120. The preparation surface 120 may be formed as a "sleeve" 132 in a suitable shape (e.g. generally rectangular, etc.) having an internal passage 134 (e.g. "sealed" cavity, plenum, flow area, etc.) for providing a flow of coolant in contact with an underside of the preparation surface (e.g. by providing the coolant at a positive gage pressure, etc.). The thickness of the preparation surface 120 (shown schematically as the top of the sleeve 132) may be any suitable thickness intended to minimize deflection (e.g. "ballooning" etc.) of the top of the sleeve 132 from the pressure of the coolant within the sleeve.

The width of the internal passage 134 of the sleeve 132 may extend approximately from the front 122 to the back 124 of the refrigerated worksurface and may have any suitable height to permit a suitable flow rate of coolant to provide cooling to the preparation surface 120. For example, the height of the passage may be generally within the range of approximately one-quarter inch to one inch, and more particularly within the range of approximately one-quarter inch to one-half inch.

The interior passage 134 of the sleeve 132 may also be provided with internal structure 136 (e.g. ribbing, spacers, bridges, etc.) that interconnects (e.g. "ties") the top and bottom of the sleeve 134 to provide a suitable degree of stiffening to support the weight of the sleeve, the coolant, and the food products to be placed thereon, and to prevent excessive deflection or distortion of the surfaces of the sleeve. Such internal structure may also be configured to function as flow guides or distributors (e.g. "baffles" or the like) for routing or directing the flow of coolant within the sleeve to provide a desired cooling pattern on the preparation surface (e.g. a "zig-zag" pattern, an alternating pattern, a reciprocating pattern, etc.). For example, the internal structure may also be provided with openings (e.g. "cutouts," "windows" etc.) configured to create a desired flow path for the coolant through the internal passage 134, or the internal structure 126 may be configured with openings 138 at alternating sides of the sleeve 132. The internal structure 126 may be joined to the sleeve 134 by any suitable process such as welding, brazing, fasteners, etc.).

An insulation layer may be provided along the bottom of the sleeve to reduce the tendency for condensation to form on the bottom of the sleeve and to improve the thermal performance of the refrigerated preparation table. The insulation layer may be any suitable insulation material and composition such as an insulation foam panel and may be provided in any suitable thickness.

Referring to FIG. 6A, a drain system 140 is provided at the second end 128 of the sleeve 132 collectors 130 are configured to drain liquids to collection header 137. According to the illustrated embodiment, the base is configured to interconnect with the collectors along the front side 122 and the back side 124 of the preparation surface 120.

An enclosure 150 (e.g. case, housing, etc.) is provided beneath the sleeve 132 (shown schematically in FIGS. 6A-6C as generally "centered" along a bottom surface of the sleeve) and configured for containing, supporting and routing components of the cooling system 170, such as coolant supply line 172 and coolant return line 174 or headers, fittings, flow control devices (e.g. balance valves, shut-off valves, thermostatic expansion valves, control devices, etc.). The enclosure 150 may be provided along a portion, or along substantially all, of the length of the sleeve 132, and is also intended to provide structural support to the sleeve 132.

The sleeve 132 may be provided in any particular shape, such as generally "straight" (as shown) or "L-shaped" for use in corners, or may be "curved" or the like. The passage through the sleeve may be one generally continuous passage having an inlet fluid opening 127 to supply the coolant at the first end 126 and an outlet fluid opening 129 to return the coolant at the second end 128 of the sleeve 132. According to an alternative embodiment, the passage may be partitioned into any desirable number of separate sections each having a supply and return flow path for flow of coolant therethrough. Such sections may receive coolant in a parallel flow configuration that may be controlled by separate temperature sensing device and valves associated with each section. According to another alternative embodiment, manifolds or "headers" may be provided at the ends of the sleeve to supply coolant to a first end of the sleeve (e.g. inlet, etc.) and to receive coolant from a second end of the sleeve (e.g. outlet, etc.). According to any preferred embodiment, the coolant is configured to flow through the passage in any desirable pattern in an arrangement that provides contact between the coolant and the top of the sleeve (i.e. the underside of the preparation surface) to provide contact cooling to the preparation surface.

The coolant provided by the cooling system for flow through the sleeve is preferably a liquid coolant (e.g. secondary coolant, etc.) such as a glycol solution, chilled water, etc. However, the coolant may be a refrigerant (e.g. primary refrigerant, etc.), for example, a direct expansion refrigerant such as R22 or the like, according to alternative embodiments. The coolant may also be other suitable mediums, such as, for example, an ice slurry or the like that is capable of flowing through the headers and cooling elements.

The temperature of the preparation surface 120 may be controlled by regulating the rate of flow of the coolant through the passage 134 of the sleeve 132. For example, the rate of the flow of the coolant may be varied (e.g. metered, regulated, etc.) by devices such as flow control valves, balance valves, metering valves or the like, or may be controlled by providing a flow of the coolant through the sleeve intermittently (e.g. periodically, etc.) by opening and closing (e.g. cycling, pulsing, etc.) a flow regulating device such as a "shut-off" valve (e.g. solenoid operated valve, etc.). For applications involving a coolant that is a refrigerant, the flow of the coolant may be regulated by a thermostatic expansion valve or the like.

According to alternative embodiments, the preparation surface may be formed with individual passages on the underside for circulating a flow of coolant in any desired pattern along the underside of the preparation surface.

According to any preferred embodiment, the cooling element in the form of the sleeve 132, passage 134 and structural members 136 are intended to provide a substantially uniform temperature on the preparation surface 120, and to support the weight of the coolant and objects such as food products intended for use on the preparation surface 120.

Referring to FIGS. 1-3 the base of the refrigerated worksurface is shown according to an embodiment for use with "separate" cooling element(s) (e.g. such as removable pans, etc.). The base 50 provides a support structure for the pan(s) 60 and the preparation surface 20 and includes a generally planar section 51 beneath one portion of the pans 60 and a recessed section 52 (passage, well, pipe-chase, etc.) beneath another portion of the pans 60 for routing portions of the cooling system (e.g. valves, fittings, tubing, etc.) to the pans.

The base 50 includes a peripheral ledge 53 and support beams 54 for supporting an outer edge of each pan 60. The support beams 54 are intended to be removable and are configured for placement along adjacent internal sides of the pans 60. The support beams 54 are also provided with an "arch" corresponding to the arch on the pans 60 to provide support along the length of the pans.

The recessed section 52 of the base 50 is provided with removable access panels 55 (e.g. doors, etc.) to permit access to components of the cooling system from beneath the base 50 so that activities (such as maintenance, etc.) can be performed without removing the preparation surface 20 and the cooling elements 60. The recessed section 52 of the base 50 also includes removable side panels 56 at the first end 26 and the second end 28 to permit routing of the coolant supply header 72 and the coolant return header 74 to the recessed section 52. The recessed section 52 is also provided with brackets for holding and routing the tubing sections of the cooling system.

The generally planar section 51 of the base 50 has an underside that is preferably insulated to improve the thermal performance of the refrigerated preparation table. The insulation is preferably a panel of an insulating foam material, but may be any suitable insulating material, such as a blanket, sprayed-on insulation, etc.

According to a preferred embodiment, the base 50 is made of a sheet metal material (shown as galvanized steel) but may be any suitable material (such as aluminum, stainless steel, plastic, etc.).

According to any preferred embodiment, the base 50 provides a support structure for the cooling element(s) and the preparation surface, and provides structure for routing a portion of the cooling system that interfaces with the cooling element(s).

Referring to FIG. 5, the cooling system 70 of the refrigerated worksurface is shown according to an embodiment. The cooling system 70 is configured to route a supply of a coolant (e.g. a secondary liquid coolant, such as a water-glycol solution, ice slurry, etc.) to and from the pan(s) 60. According to a preferred embodiment the coolant is a secondary liquid coolant supplied to the cooling element(s) at a temperature of approximately 20 degrees F. According to alternative embodiments, the temperature of the coolant may be any suitable temperature intended to maintain a desired temperature or heat removal capability at the preparation surface and may be varied to account for humidity in the area of the table and condensation at the preparation surface, or changes in flow rates etc. For example, the flow rate of the fluid may be decreased and the temperature of the fluid may also be decreased. Likewise, the flow rate of the fluid may be increased and the temperature of the fluid may also be increased.

According to any exemplary embodiment, the cooling system may interface with an existing cooling system in a facility where other refrigeration devices are interconnected in a network (not shown) by the cooling system.

According to other embodiments, the cooling system may be self-contained at the refrigerated worksurface by providing a refrigeration system having a primary refrigerant loop and a secondary cooling loop interconnected by a chiller (not shown). Such a self-contained cooling system may be provided within the stand or the base of the refrigerated worksurface and may be used in connection with multiple refrigerated worksurfaces within a facility.

According to any preferred embodiment, the cooling system 70 includes a supply header 72 for supplying coolant to the cooling element(s) and a return header 74 for receiving coolant from the cooling element(s).

Referring to FIG. 5, a cooling system providing a parallel flow arrangement to multiple pans is shown. The supply 72 and return 74 headers are provided with fittings 76 (e.g. quick-disconnects fittings, etc.) to permit convenient coupling or interconnection of the headers with cooling system supply and return lines. The supply header 72 is provided with branch supply lines 78 having a fitting 80 (e.g. quick-disconnect fittings, spring-clip fittings, hose clamps, etc.) for interconnecting with the supply "stubs" 62 extending from the underside of the pans 60. The return header 74 is provided with branch return lines 82 having a fitting 80 for interconnecting with the return "stubs" 64 extending from the underside of the pans 60.

Referring further to FIG. 5, the return header 74 is shown to include a balance valve 84 (shown as a manually-operated gate valve, etc.) and a shut-off valve 86 (shown as a solenoid-operated valve) at a location "downstream" of the "last" return branch line 82. The balance valve 84 is intended to provide a suitable amount of back-pressure within the cooling elements when the shut-off valve 86 is open to permit the desired flow rate of coolant through the cooling elements for maintaining a desired cooling rate at the preparation surface. The balance valve 84 may be accessed through the access panel 55 in the recessed section 52 of the base 50 and adjusted during setup of the refrigerated worksurface, or when conditions change that may otherwise require varying the amount of cooling provided at the preparation surface.

The shut-off valve 86 is intended to provide a coolant flow control system to regulate the flow of coolant through the cooling elements. For example, in a first mode of operation of the cooling system the shut-off valve 86 may be open continuously during operation of the refrigerated worksurface, and closed when the refrigerated worksurface is not in service.

In a second mode of operation of the cooling system, the shut-off valve 86 may be opened and closed (e.g. "cycled," "toggled," etc.) based on the cooling demands of a particular application. For example, the shut-off valve may be cycled on a predetermined frequency (e.g. "pulsed" such as by a timer, etc.) to suit the cooling demands required by a user.

According to another embodiment, the operation of the shut-off valve may be regulated by a temperature control device (e.g. thermostat, etc.).

For example, one or more temperature sensing devices (e.g. thermocouples, etc.) may be provided at suitable location(s) on the top side or underside of the preparation surface 20, 120 or on one or more cooling elements (such as near the ends of the preparation surface which may tend to be "warmer" than areas at a midsection of the preparation surface) to provide a signal representative of temperature of the preparation surface 20, 120 to a controller configured to provide a signal to open the shut-off valve when the temperature of the preparation surface 20, 120 reaches a "high" temperature limit and to provide a signal to close the shut-off valve when the temperature of the preparation surface reaches a "low" temperature limit. According to a preferred embodiment, the high temperature limit is approximately 33 degrees F. and the low temperature limit is approximately 30 degrees F., however, other suitable temperature limits may be provided to suit a particular application or facility.

By further way of example, the temperature sensing device may be included within the shut-off valve as an integrated temperature sensing and controlling unit.

According to an alternative embodiment, the return branch lines may be provided with a separate balance valve and shut-off valve for each cooling element to provide a separate coolant flow regulation system for each cooling element.

According to a further alternative embodiment, the cooling system may be configured to circulate coolant to the cooling elements in a "series" configuration, such as by interconnecting the return stub of a first cooling element with the supply stub of a second cooling element, etc. According to a further alternative embodiment, a temperature regulating valve may be provided that is configured to modulate between an open and closed position according to a signal from a control system that compares a signal representative of the temperature of the preparation surface to a predetermined desired temperature range.

Referring further to FIGS. 1-3, a stand 90 of the refrigerated worksurface is shown according to an embodiment. The stand 90 is configured to provide a support structure for the preparation surface 20, 120, the cooling element(s), the base 50, 150 and the cooling system. The stand 90 is shown as including generally vertical legs 92 having adjustable "feet" 94 at a lower end and coupled at an upper end to a support member (e.g. beam, etc.) for supporting the base. The feet are intended to permit positioning the preparation surface at a desired pitch to permit drainage of liquids to the collection header, and for otherwise "leveling" the preparation surface to account for variations in the floor of the facility.

It is also important to note that the construction and arrangement of the elements of the refrigerated worksurface as shown in the preferred and other exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the operation of the interfaces (e.g. clamps, brackets, etc.) may be reversed or otherwise varied, the length or width of the structures and/or members or connectors or other elements of the system may be varied, the nature or number of the cooling elements may be varied (e.g. by variations in the number of cooling elements or size and shape of the cooling elements or type of engagement between the cooling elements and the cooling system). It should be noted that the elements and/or assemblies of the refrigerated preparation table may be constructed from any of a wide variety of materials that provide sufficient strength or durability or heat transfer characteristics, in any of a wide variety of colors, textures and combinations. It should also be noted that the refrigerated worksurface may be used in association with other refrigeration devices or in combination with multiple refrigerated worksurfaces, or any of a wide variety of other equipment in any of a wide variety of other applications. Further, a wide variety of coolants may be used in connection with the refrigerated worksurface, and the cooling system may be configured to provide the flow of coolant to the cooling elements in a series or a parallel flow path configuration, and the flow of coolant to the cooling elements may be controlled for individual cooling elements or group(s) of cooling elements. Further, the configuration and orientation of the baffles for use with the "flooded" type cooling element may be provided in any desirable number, shape, orientation and configuration to obtain a desired temperature profile or cooling performance pattern on the preparation surface. Accordingly, all such modifications are intended to be included within the scope of the present inventions. Other substitutions, modifications, changes and omissions may be made in the design, operating conditions and arrangement of the preferred and other exemplary embodiments without departing from the spirit of the present inventions.

The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the present inventions as expressed in the appended claims.

What is claimed is:

1. A refrigerated preparation table for maintaining a cold worksurface for processing food products, comprising: a base, a plurality of cooling elements supported on the base, a worksurface interfacing with the cooling elements, a cooling system configured to circulate a liquid coolant to the cooling elements, a supply header and a plurality of supply branch lines configured to provide coolant to each cooling element and a return header and a plurality of return branch lines configured to return coolant from each cooling element, and a valve on at least one of the supply branch line and the return branch line for each cooling element, and a control system configured to permit independent control of coolant circulation to each cooling element, so that additional cooling capability is available for frequently used sections of the worksurface and reduced cooling capability is available for less frequently used sections of the worksurface.

2. The refrigerated preparation table of claim 1 wherein the cooling elements are generally flat members configured to engage an underside of the worksurface.

3. The refrigerated preparation table of claim 1 further comprising a drainage system configured to promote drainage of fluids from the worksurface.

4. The refrigerated preparation table of claim 1 wherein the worksurface is configured for removal to provide access to the cooling elements.

5. The refrigerated preparation table of claim 1 wherein the coolant is a liquid in a secondary cooling system that is configured to be chilled by a primary cooling system.

6. The refrigerated preparation table of claim 5 wherein the secondary cooling system is substantially self-contained proximate the worksurface.

7. The refrigerated preparation table of claim 5 wherein the secondary cooling system is a common system shared with other refrigeration devices.

8. The refrigerated preparation table of claim 1 further comprising a thermally conductive material disposed between the cooling elements and the worksurface.

9. The refrigerated preparation table of claim 1 wherein the cooling system is configured to regulate flow of the coolant to the cooling elements to maintain a temperature of the worksurface within a predetermined temperature range.

10. The refrigerated preparation table of claim 1 wherein the cooling elements are removable to facilitate maintenance and cleaning.

11. The refrigerated worksurface of claim 1 wherein one end of the worksurface is configured for coupling to an end of another worksurface.

12. The refrigerated worksurface of claim 1 wherein the base, the cooling elements, the cooling system, the control system, and the worksurface are configured for shipment at least in a partially dissembled state for assembly at a final destination.

13. The refrigerated preparation table of claim 1 wherein the base includes a stand for supporting the worksurface as a table.

14. The refrigerated preparation table of claim 1 further comprising a layer of insulation disposed beneath the cooling elements.

15. The refrigerated preparation table of claim 1 wherein the cooling elements have an arched profile configured to promote contact between the cooling elements and an underside of the worksurface.

16. The refrigerated preparation table of claim 1 wherein the cooling elements are generally flat with a pattern of passages for flow of the coolant therethrough and configured to engage an underside of the worksurface.

17. The refrigerated preparation table of claim 1 further comprising a plurality of temperature sensors on at least one of the worksurface and the cooling elements and configured to provide a signal representative of temperature to the control system.

18. The table of claim 17 wherein the control system regulates the position of the valves according to the signal so that the temperature of the sections of the worksurface remain within a predetermined range.

* * * * *